United States Patent
Harris

(10) Patent No.: US 7,073,135 B2
(45) Date of Patent: Jul. 4, 2006

(54) INFORMATION PERSONALISATION METHOD

(75) Inventor: Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/142,611

(22) Filed: May 9, 2002

(65) Prior Publication Data
US 2003/0067483 A1   Apr. 10, 2003

(51) Int. Cl.
    *G06F 3/00*      (2006.01)
(52) U.S. Cl. ..................... 715/772; 715/738
(58) Field of Classification Search ............... 715/528, 715/529, 744, 745, 760, 772, 822, 859
    See application file for complete search history.

(56) References Cited

U.S. PATENT DOCUMENTS

| | | | |
|---|---|---|---|
| 5,333,256 A | 7/1994 | Green et al. ............... 395/159 |
| 5,821,927 A | 10/1998 | Gong ......................... 345/335 |
| 6,243,089 B1 | 6/2001 | Gong ......................... 345/335 |
| 6,631,369 B1 * | 10/2003 | Meyerzon et al. ............ 707/4 |
| 6,745,230 B1 * | 6/2004 | Cao et al. ................... 709/206 |

* cited by examiner

*Primary Examiner*—Ba Huynh
*Assistant Examiner*—Truc T. Chuong
(74) *Attorney, Agent, or Firm*—Marilyn S. Dawkins; Amy J. Pattillo

(57) ABSTRACT

A method of information personalization is provided, whereby the information has an associated status indication (such as, an image or picture for example). Firstly, information is displayed (via a Web browser for example). Next, a process to determine the presence of one or more attributes associated with the status indication is carried out. If it is determined that one or more attributes exist, each of the attributes is compared against a respective threshold, whereby each of the thresholds determines rendering of the associated status indication. In response to the comparing, if one or more respective thresholds are met, the associated status indication is displayed as an updated status indication (whereby, the status indication is partially visible or non-visible for example). If one or more respective thresholds are not met, the associated status indication is displayed (whereby, the status indication is unchanged for example).

18 Claims, 7 Drawing Sheets

INFORMATION PERSONALISATION METHOD

FIELD OF THE INVENTION

The present invention relates to information personalisation.

BACKGROUND OF THE INVENTION

In the World Wide Web (WWW) environment, client machines communicate with Web servers using the Hypertext Transfer Protocol (HTTP). The Web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a Uniform Resource Locator (URL) having a special syntax for defining a network connection. So called Web browsers, for example, Netscape Navigator (Netscape Navigator is a registered trademark of Netscape Communications Corporation) or Microsoft Internet Explorer, which are applications running on a client machine, enable users to access information by specification of a link via the URL.

FIG. 1 shows an example of a typical Web browser graphical user interface ("GUI") display on a client computer. On a portion (100) of a user's computer display, a Web browser (110), in this example Netscape Navigator, runs in its own window. In this example, the Web browser is currently pointed to the top-level or home page of the example Web site, as indicated by the URL http://www.corp.com in the location bar (140). This Web page, "index.htm", is configured to split the GUI display into three frames. The upper frame (120) is used to display a general banner, the left frame (130) is used to display a list of hyperlinks from the top-level Web page (or navigation bar), and the right bottom frame (150) displays the contents of the currently selected Web page. The top of the Web browser display includes a row of control icons, including a "back" button (160) and a "forward" button (170). Additionally, a domain history button (180) provides a drop down history list of the URLs of Web sites most recently visited by the browser application.

When the user of the Web browser selects a link, the client issues a request to a naming service to map a hostname (in the URL) to a particular network IP (Internet Protocol) address at which the server is located. The naming service returns an IP address that can respond to the request. Using the IP address, the Web browser establishes a connection to a server. If the server is available, it returns a Web page. To facilitate further navigation within the site, a Web page typically includes one or more hypertext references ("HREF") known as "anchors" or "links".

Currently, some Web pages display icons, each icon representing a link to dynamic information that changes over time, such as product information in an advertiser's "home" page. In FIG. 2, there is shown an entry (210) with an icon (200) alongside it, whereby the icon (200) is emphasised with the term "NEW". Once a user clicks on the entry (210), he/she is typically routed to an associated dynamic piece of information. However, with some Web pages, it is frustrating for a user to follow an entry (with an associated emphasised icon conveying that the entry is "new") and finding that he/she has been routed to information that is out of date, partially out of date or, information which they have already seen. It is often the case that during maintenance of Web pages, the state of emphasised icons remains static and is not updated. This results in outdated icons and therefore, by placing emphasis on these icons, a user is misinformed.

Additionally, users are currently unaware of the length of time that an emphasised icon has been displayed on a Web page. For example, even if an icon is tagged as "NEW", the relevance of the associated material will degrade over time. Currently this aspect cannot be conveyed effectively to the user.

U.S. Pat. No. 5,333,256 describes an application or terminal emulation program executed on an information processing system. The program is represented by the display of a first icon on a display device. If during the execution of the application or terminal emulation program, a virtual display buffer associated with the application program, is updated, a second icon is displayed on the display device to indicate to a user of the system that a change in the status of the program has occurred.

U.S. Pat. Nos. 5,821,927 and 6,243,089 B1 describe network browser applications which are improved by providing visual status indications informing users that currently displayed pages are one of: old (outdated), partly old or new. Conventional browser applications load old or partly old page information from a cache and new information from a (usually remote) server to which the browser links via a network. A user expecting to view only new information (e.g. information that might be useless if out of date) is alerted by present status indications to request the browser to reload the entire page; which the user can do by operating a reload selector/icon conventionally presented by the browser. Various alternative status indications are shown, along with potential associations of such with a reload selector button (or equivalent icon). Specifically, U.S. Pat. No. 5,821,927 details a browser display indicator which signals to the user that the Web page currently displayed need to be refreshed from a remote source, for example, by using differently coloured icons. U.S. Pat. No. 6,243,089 B1 details a browser display indicator which signals to the user that the Web page currently displayed need to be reloaded, for example, by using selectively illuminated icons.

The current problem with visual status indications within the Internet environment is that they are viewed generically by all users. Thus, there is a need for personalised views of these indications within a Web browser session. There is also a need for the visual status indications to be automatically maintained. There is also a need to convey the age of the visual status indications to a user.

SUMMARY OF THE INVENTION

According to a first aspect, the present invention provides a method of information personalisation, said information having an associated status indication, said method comprising the steps of displaying said information; determining the presence of one or more attributes associated with said status indication; in response to a successful determining step, comparing each of said attributes against a respective threshold, in which each of said respective thresholds determines rendering of said associated status indication; in response to said comparing step, if one or more respective thresholds are met, rendering for display, said associated status indication as an updated status indication, and if one or more respective thresholds are not met, rendering for display, said associated status indication.

Preferably, some of the attributes are associated with the number of times the information has been viewed. Preferably, some of the attributes are associated with a time value, such as, "yyyy:mm:dd". In a preferred embodiment, the attributes are specified within a tag. In the preferred implementation, HTML tags are utilised, whereby an HTML tag demarcates data and gives structure to an HTML document.

Preferably, the comparing step further comprises the steps of: utilising a first value; utilising, in response to a successful determining step, a second value associated with each of said attributes or assigning, in response to an unsuccessful determining step, a second value, and comparing said second value to said first value, to determine said rendering of said associated status indication.

In a preferred embodiment, in the case where attributes are associated with the number of times the information has been viewed, the first value represents the actual number of times the information has been viewed by a user. Preferably, in the case where attributes are associated with a time value, the first value represents the current time and more preferably, the current time is obtained from a system clock. However, it should be understood that the time value could be obtained from any other source. In a preferred embodiment, the second value represents a threshold, whereby the threshold determines rendering of the associated status indication.

Preferably, if the associated status indication is to be rendered as an updated status indication, the first value is maintained. More preferably, if the associated status indication is to be rendered, the first value is updated.

In a preferred embodiment, in the case where attributes are associated with the number of times the information has been viewed, the utilising step described above, further comprises the steps of determining if a data block (for example, a cookie) comprising the first value is present. Preferably, if it has been determined that a first value is present, this first value is utilised. However, preferably, if it has been determined that a first value is not present, a first value is assigned. More preferably, if a data block is present, the data block is updated with the updated first value and if a data block is not present, a data block is created with an updated first value.

In a preferred embodiment, the updated status indication is non-visible. Alternatively the updated status indication is partially visible and the rendering of the updated status indication is associated with the first value. For example, if a status indication is to be updated with time, then a system administrator is able to set the length of time left until the status indication appears non-visible to the user. For the purpose of this example, if the total length of time was set as ten days, then the status indication may be displayed as partially visible after five days.

It should be understood that the status indication could be implemented as an image, as a picture, as text, as an icon, or in any other way. Preferably, the status indication comprises one or more planes of pixels.

In a preferred embodiment, the present invention is implemented in an Internet environment, whereby the information is represented within a Web page, the information is displayed via a Web browsing session and the status indication is rendered by a Web browsing session rendering process.

According to a second aspect, the present invention provides a system for information personalisation, said information having an associated status indication, said system further comprising: means for displaying information and an associated status indication; means for determining the presence of one or more attributes associated with said status indication; means responsive to a successful determining step, for comparing each of said attributes against a respective threshold, in which each of said respective thresholds determines rendering of said associated status indication; means, responsive to said means for comparing and if one or more respective thresholds is met, for rendering for display, said associated status indication as an updated status indication, and if one or more respective thresholds is not met, means for rendering for display, said associated status indication.

According to a third aspect, the present invention provides a computer program product comprising computer program code stored on a computer readable storage medium which, when executed on a computer, performs the method as described above.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 1:
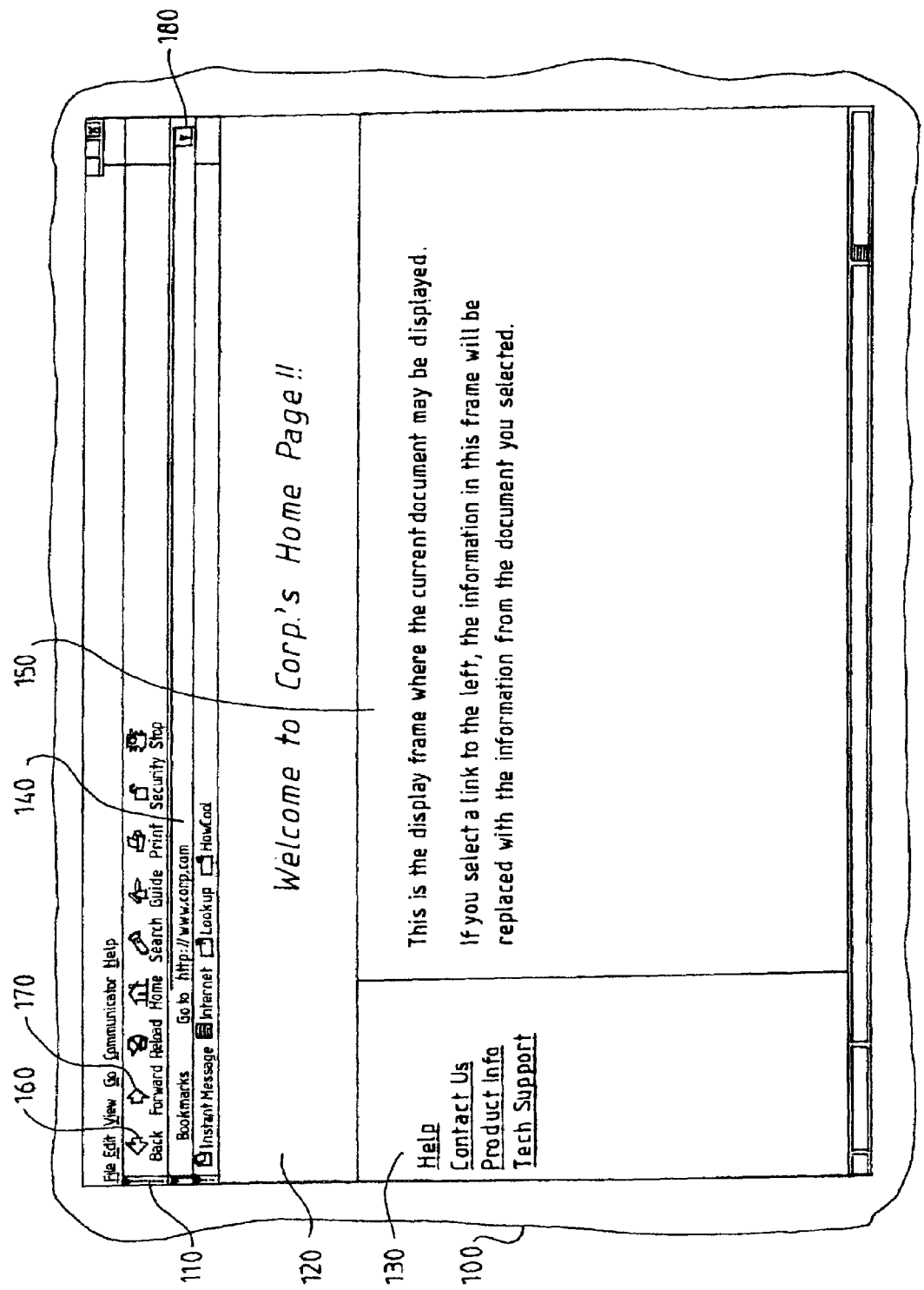
FIG. 1 shows a prior art example of a display in a typical Web browser graphical interface window.
Figure 2:
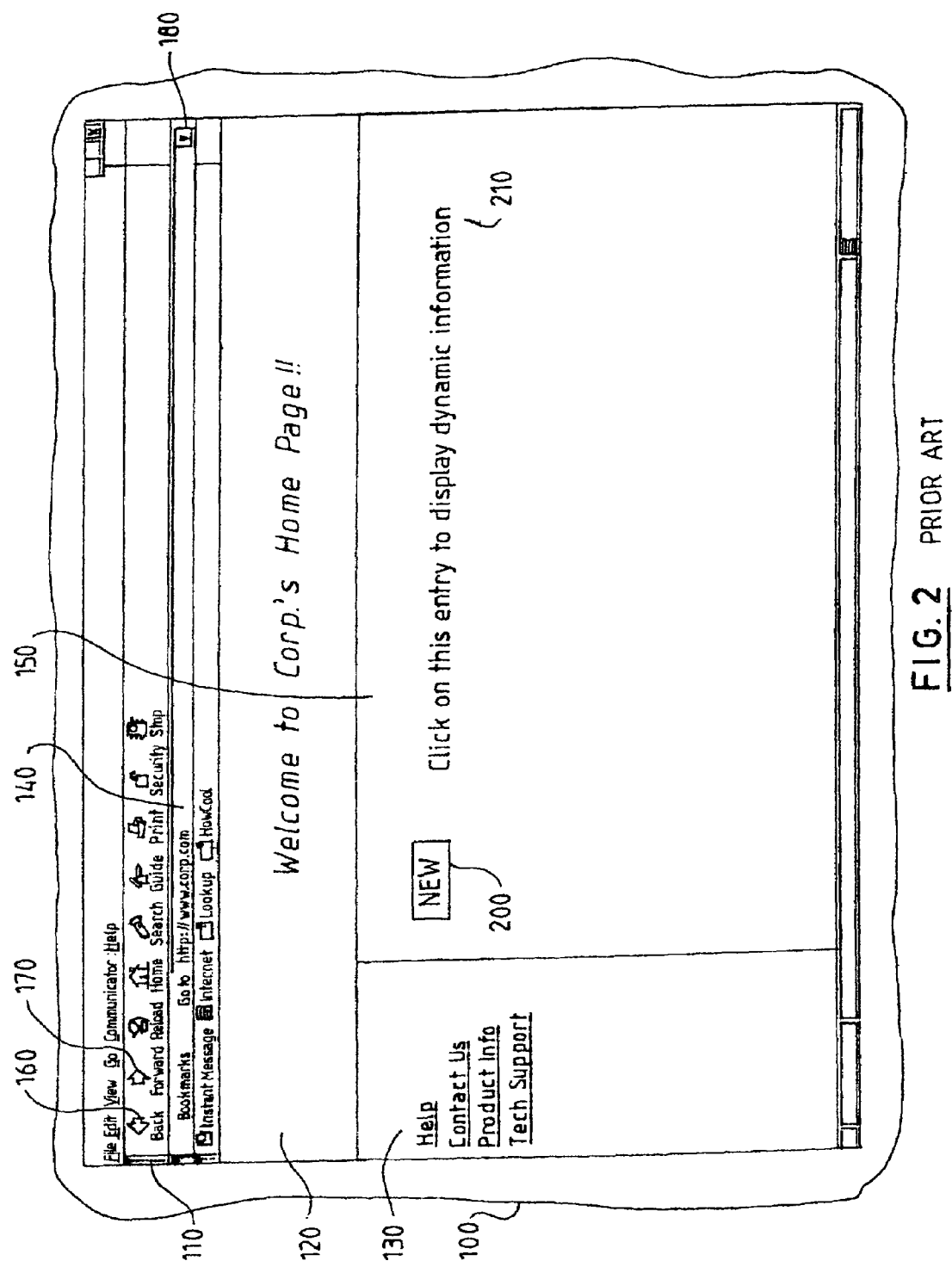
FIG. 2 shows a prior art entry on a Web page, with an emphasised icon alongside it.
Figure 3:
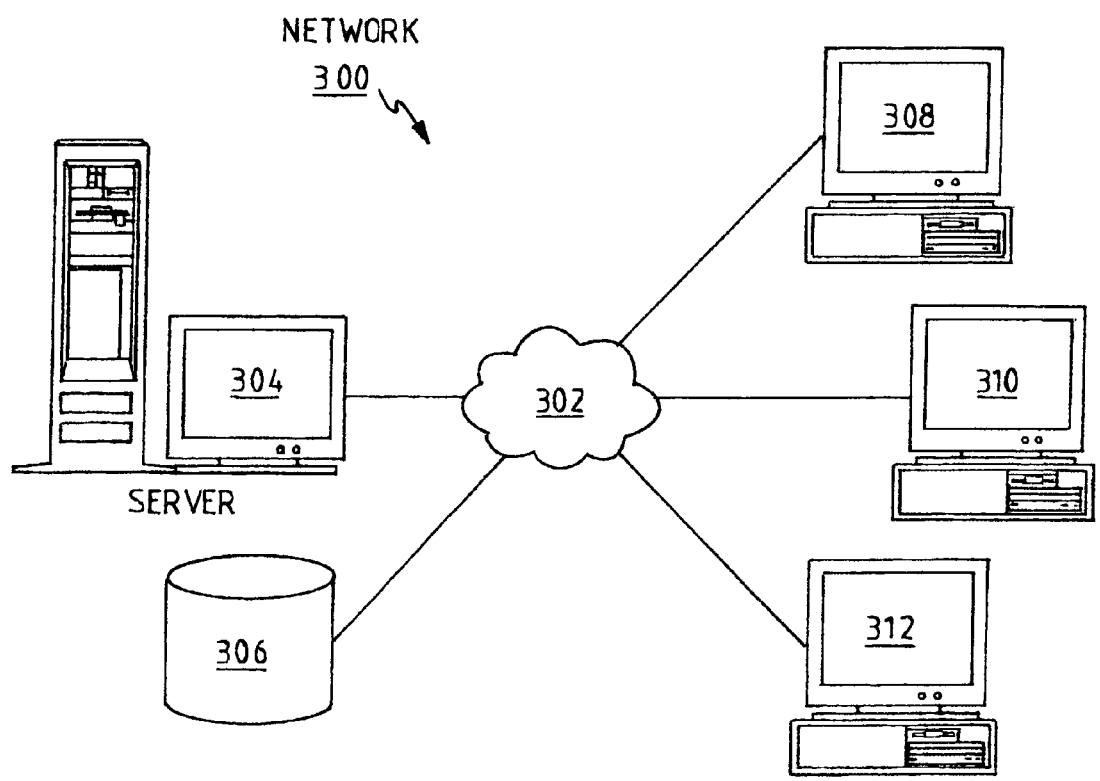
FIG. 3 shows a prior art distributed data processing system in which the present invention may be implemented.

FIG. 3 shows a representation of a distributed data processing system in which the present invention may be implemented. Distributed data processing system (300) comprises a number of computers, connected by a network (302). Server computer (304) is connected to network (302) along with a storage unit (306) and client computers (308), (310) and (312). Preferably, each client computer has a Web browser running on it. In the depicted example, distributed data processing system (300) is the Internet, with network (302) representing a world-wide collection of networks and gateways that use the transmission control protocol over internet protocol (TCP/IP) suite of protocols to communicate with one another.

Generally, the present invention provides a technique in which images are accentuated on only the first occasion of loading a Web page. That is, the state of an image will be updated once a user has re-visited a Web page. Additionally, a technique to convey the "age" of an emphasised image is also provided.

It should be understood that although an image is described herein, the present invention could also be implemented with any other status indications, such as, pictures, text, icons etc. An image consists of a plurality of picture elements (pixels). An image composed of a picture, for example, an "animated GIF" (Graphical Image Format), can consist of a single plane of pixels or a plurality of planes of pixels.

It should also be understood that although the Internet medium is described herein, the present invention could also be implemented in other media, such as in databases or electronic mail systems. In this description the term "emphasised image" should be understood as an image which has an enhanced visual appearance, for example, the image appears to flash on a Web page.

Figure 4:
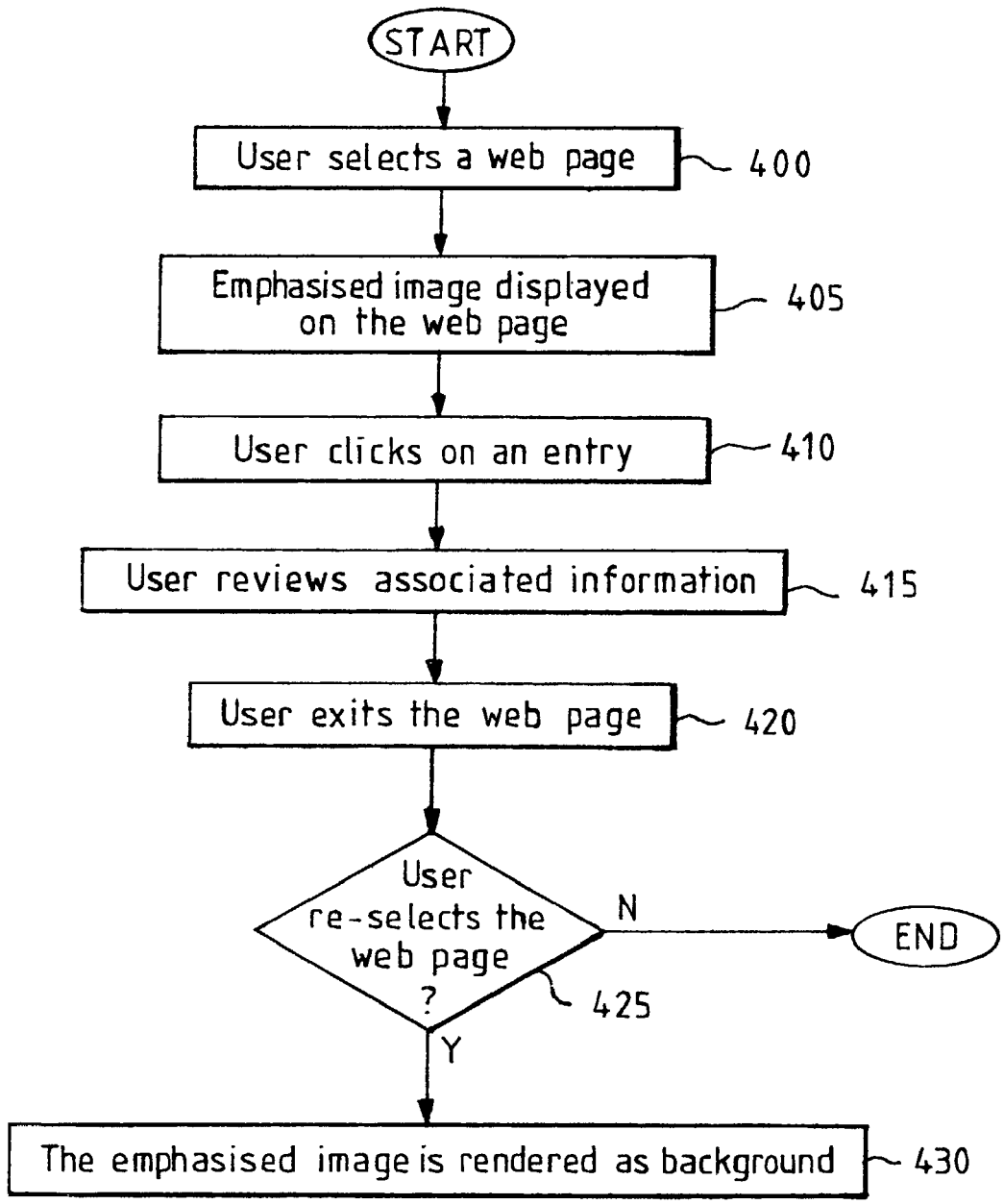
FIG. 4 is a flow chart showing the operational steps involved in the automatic maintenance of icons.

The present invention will be described under two main categories:

1. Technique to provide dynamic representation of an image
2. Technique to provide an indication of the age of an image 1. Technique to Provide Dynamic Representation of an Image This technique allows an image to be displayed on a Web page until a user has re-visited that Web page and it will now be described with reference to FIG. 4. In FIG. 4, an image is displayed until a user re-visits a Web page on a subsequent occasion. Firstly, a user selects (step 400) a Web page within a Web site, whereby the Web page displays (step 405) emphasised images. Next, a user may click (step 410) on an associated entry and is then routed to the information associated with that entry. Once the user has reviewed (step 415) this information, he/she exits (step 420) the Web page. If the user does not re-select the Web page, that is, a negative result to step 425, the process ends. However, if the user does choose to re-select the Web page, that is, a positive result to step 425, the image does not appear (step 430) to the user. Preferably, to implement this, the rendering process does not render the plurality of pixels associated with an image. In the preferred embodiment, step 430 is actually implemented by rendering the plurality of pixels associated with the background of the Web page displaying that image. For example, if a Web page has a white background, the image would be rendered as white. Alternatively, step 430 could be implemented by rendering nothing. Other alternatives are discussed later in the description.

If the present invention were to be implemented with textual entries that can be selected by clicking, at step 430, the text may be rendered as non-visible to the user, or alternatively the functionality of clicking may be removed. It should be understood that the technique preferably does not apply to standard images displayed within a Web browser, such as, the "Back" button etc.

In a preferred embodiment of the present invention, each emphasised image has an associated "cookie". In the Internet environment, when a user enters a Web site, the user's client computer sends a request to the Web server. A cookie is a data block that is stored on the user's client computer in the Web browser's cache memory by a Web server. When the user returns to that same Web site, the Web browser sends a copy of the cookie back to the Web server. In the present invention, cookies are utilised to control the rendering of a Web Page on a client computer.

Figure 5:
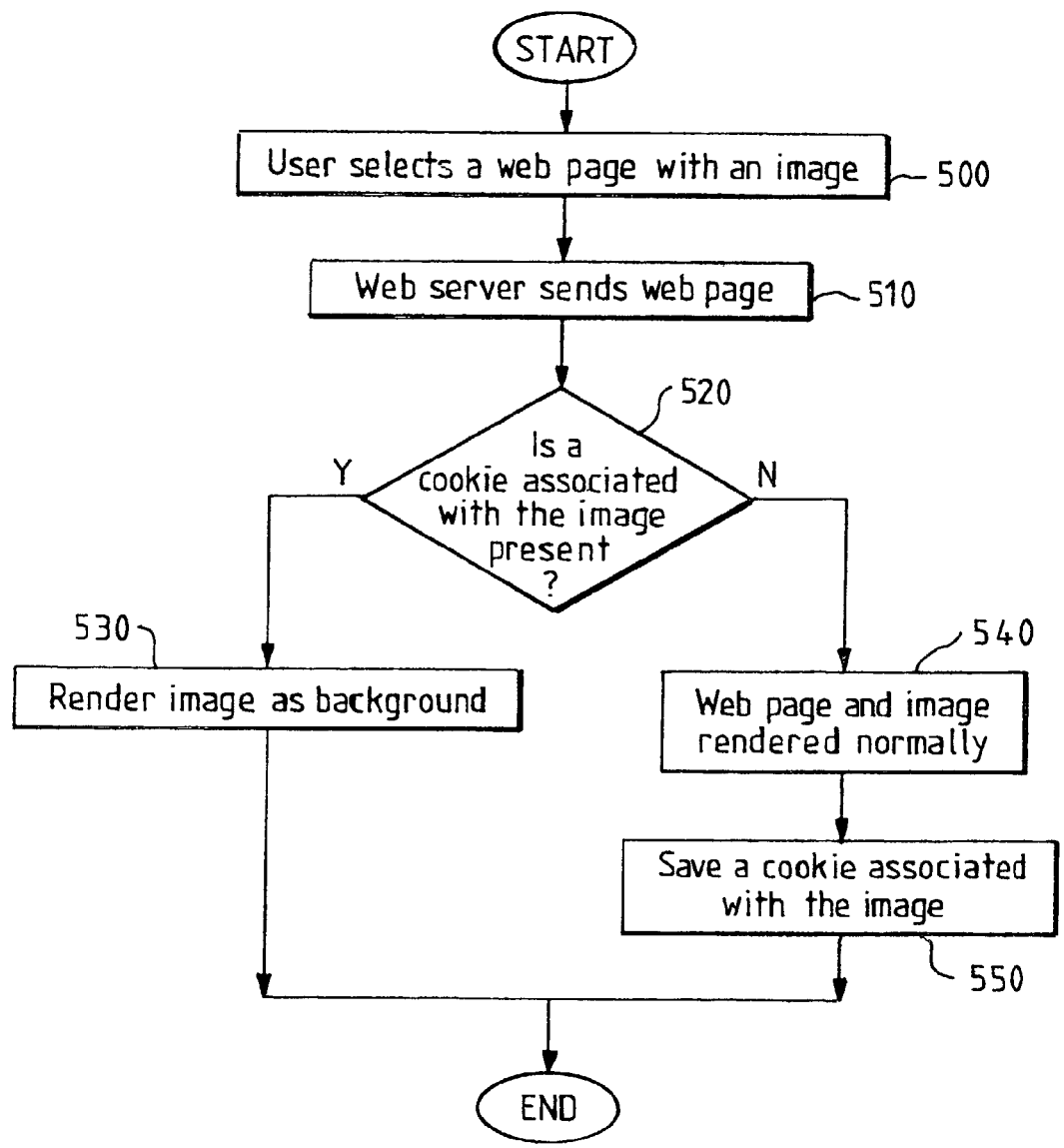
FIG. 5 is a flow chart showing the technical operational steps involved in FIG. 4.

The technical steps required in the overall process of FIG. 4 will now be described with reference to FIG. 5. Firstly, a user selects (step 500) a Web page with an emphasised image within it via a Web browser. In response to step 500, the relevant Web server returns (step 510) this Web page to the Web browser. Next, the Web browser determines (step 520) whether a cookie associated with the emphasised image is present in its cache memory. If an associated cookie is present (positive result to step 520), it is because the user has visited that Web page before. Therefore, in this example, the Web browser renders (step 530) the image to be non-visible to the user such as, for example, rendering the plurality of pixels associated with the background of the Web page displaying that image.

If an associated cookie is not present (negative result to step 520), it is because the emphasised image is yet to be viewed by the user for the first time. Therefore, in this example, the Web browser renders (step 540) the Web page and the emphasised image normally, so that the image will be visible to the user.

Once the user has viewed that image for the first time, the Web browser itself saves (step 550) a cookie associated with that image on the client computer, without reference to the Web server. Therefore, if the Web page is subsequently re-displayed or re-requested by the user, since an associated cookie is present on the client computer, the Web browser renders the plurality of pixels associated with the background of that Web page and therefore the image will be non-visible to the user.

One possible implementation of the dynamic representation technique is to add a new attribute to the "<IMG>" HTML tag. An HTML tag demarcates data and gives structure to an HTML document. The "<IMG>" HTML tag allows Web browsers to insert images at the location of the tag. The present invention preferably adds a RENDERING="DYNAMIC" attribute onto all HTML definitions that support the dynamic representation function. Examples are described below, whereby bracketed attributes represent optional entries.

Preferably, <IMG ..... [RENDERING="NORMAL"]> is the syntax of the default tag, whereby the value of the attribute "RENDERING" indicates that standard processing (as described with relation to prior art techniques) is provided, whereby the state of an emphasised image is not updated automatically. If the "RENDERING" attribute is omitted altogether from the tag, preferably the dynamic representation technique of the present invention is not provided. Instead, the Web browser renders in a standard manner.

If dynamic representation of an image within a Web page is to be implemented and if the dynamic representation is associated with the number of times a user has visited that Web page, a possible syntax of a tag is shown below:

<IMG ...... [RENDERING="DYNAMIC" [RENDERTIMES="1"]]>

In this example, the value of the attribute "RENDERING" indicates that dynamic representation of an image is to be implemented. The value of the attribute "RENDERTIMES" indicates that rendering of an image on a Web page by the Web browser, is associated with a certain number of visits to that Web page. Specifically, in this example, the default number of visits is preferably "1". Therefore, on a second visit to the Web page, the image will not be visible. The general syntax of the RENDERTIMES attribute is therefore RENDERTIMES="n", whereby "n" is a positive integer. Therefore, an image will be visible for "n" visits to a Web Page, but will not be visible on the "n+1" or thereafter visits. Also, in the case of the "RENDERTIMES" attribute, a "count" value is held in a cookie. Preferably, the "count" value signifies the number of times a user has actually visited a Web page with an emphasised image within it.

The technical steps involved in the processing of the RENDERTIMES attribute will now be described with reference to FIG. 6. Firstly, a user selects (step 500) a Web page with an emphasised image within it. In response to step 500, the relevant Web server returns (step 510) this Web page to the Web browser. Next, at step 520, a determination is made by the Web browser as to whether a cookie associated with the emphasised image is present in its cache memory. If a cookie is present (positive result at step 520), the current "count" value held in the cookie is utilised (step 600). If a cookie is not present (negative result at step 520), the "count" value is assumed to be "0" (step 605).

The processing then passes to step 610, where it is determined whether the RENDERTIMES attribute is present in the HTML tag. If the attribute is present, the value "n", of the attribute, will be utilised (step 615). If the attribute is not present, the value of the attribute "n" is assumed (step 620) to be "1". In step 625, the relevant values of "count" and "n" are utilised to determine whether the "count" value is more than or equal to the "n" value.

If the "count" value is more than or equal to the "n" value, (positive result at step 625), this is because a user has visited the Web page more times than or an equal number of times to the threshold for rendering an emphasised image as non-visible. Therefore, the cookie associated with the emphasised image is not updated (step 630) and the Web browser renders (step 530) the plurality of pixels associated with the background of the Web page. The emphasised image will therefore be non-visible to the user.

If the "count" value is not more than or equal to the "n" value, (negative result at step 625), the "count" value (from step 605) is incremented (step 635) by one, because the user has now logged one visit to the Web page since the process started. Since the user has not met the threshold for rendering an emphasised image as non-visible, the Web browser renders (step 540) the emphasised image normally, so that the image will be visible to the user. Additionally, a cookie is created (step 550) for the emphasised image by Web browser, whereby the cookie holds an updated "count" value (as calculated in step 635). In the case where a cookie already exists, in step 520, the cookie would be overwritten with an updated "count" value in step 550.

The process will repeat until the user has exceeded the threshold as determined in 625, in this case the threshold being "1" visit. Then, the process passes to step 630 where the cookie is updated and the image will appear (step 530) non-visible.

2. Technique to Provide an Indication of the Age of an Image

Generally, this technique enables an image to either automatically disappear completely, or deteriorate with time until the image has disappeared altogether, so that a user is able to realise the length of time that an image has been displayed on a Web page. The latter deterioration function allows visual information to be conveyed to a user whereby an image is fully visible when new, partly visible when partly old (whereby data is retrieved partly from the local cache and partly from the originating Web server), and non-visible when old (whereby data is retrieved entirely from local cache). This solves a problem associated with current Web browsers, whereby the status of emphasised images are often out of date, due to a lack of maintenance.

Preferably, in this technique, the location (in terms of position and size), or in other words the "space" reserved in storage on the Web page for an image itself, does not change. However, preferably it is the contents (pixels) of the image that changes with age. That is, the pixels are removed, reduced or made less visible with age. Alternatively, the plane(s) of pixels are removed, reduced or made less visible with age. This has the effect of altering the visibility of an image. Therefore, it should be understood that even if an image is non-visible, it still occupies a location (space), within the Web page.

If dynamic representation of an image within a Web page is to be implemented and if the dynamic representation is associated with the age of an emphasised image, a possible syntax of a tag is shown below:

<IMG ...... [RENDERING="DYNAMIC" [RENDERUNTIL="yyyy:mm:dd"]]>

In this example, the value of the attribute "RENDERING" indicates that dynamic representation of an image is to be implemented. That is, an image will completely disappear with age. Alternatively, the image may appear deteriorated to the user and this will be described in more detail later. The value of the attribute "RENDERUNTIL" represents a time value, in this case an "end" date—whereby, an image is visible until that date is reached. After the date has passed, the image will be non-visible. Alternatively, the value of an attribute "RENDERFROM" could represent a "start date" whereby at and after that date, the emphasised image appears non-visible.

The technical steps involved in the processing of the RENDERUNTIL attribute will now be described with reference to FIG. 7. The syntax of the tag is shown below:

<IMG ...... [RENDERING="DYNAMIC" [RENDERUNTIL="yyyy:mm:dd"]]>

It should be understood that this attribute does not require the usage of a cookie for processing and that a value for the current date or time is obtained from another source, such as a system clock.

At step 700, it is determined whether the RENDERUNTIL attribute is present in the HTML tag. If the attribute is not present (negative result at step 700), the ageing function is not active at all, so the process ends and the Web browser renders emphasised images in a standard fashion. If the attribute is present (positive result at step 700), processing then passes to step 710, where it is determined whether the "current" value for the date is more than or equal to the date value associated with the RENDERUNTIL attribute.

If the "current" value is not more than or equal to the date value, (negative result at step 710), the threshold for rendering an emphasised image as non-visible has not been met. Therefore, the Web browser renders (step 540) the emphasised image normally, so that the image will be visible to the user.

If the "current" value is more than or equal to the date value, (positive result at step 710), the threshold for rendering an emphasised image as non-visible has been met. Therefore, the Web browser renders (step 530) the plurality of pixels associated with the background of the Web page so that the emphasised image will be non-visible to the user. Alternatively the image could appear to the user as deteriorated and this is described below.

Figure 6:
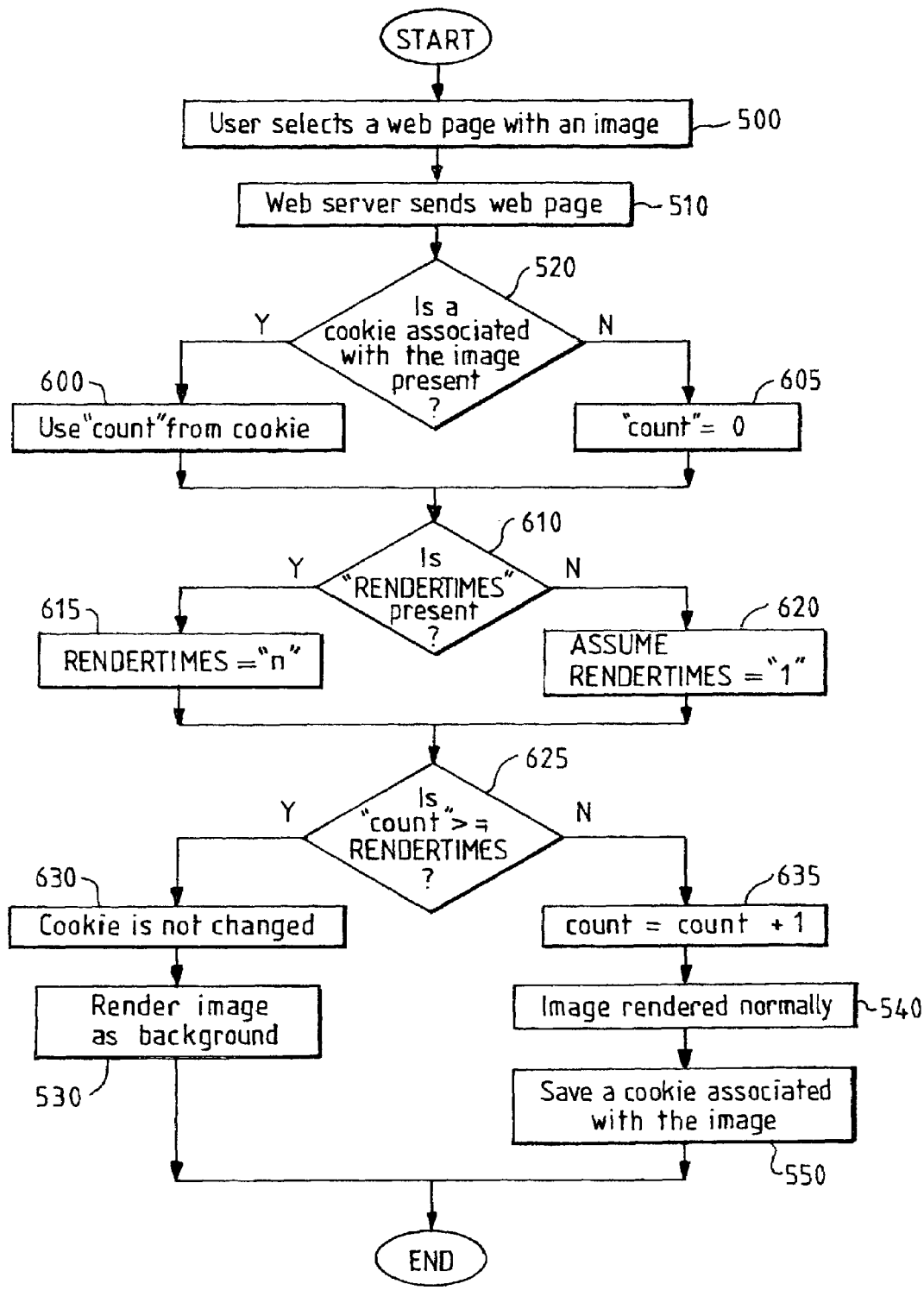
FIG. 6 is a flow chart showing the more detailed technical operational steps involved in FIG. 5.
Figure 7:
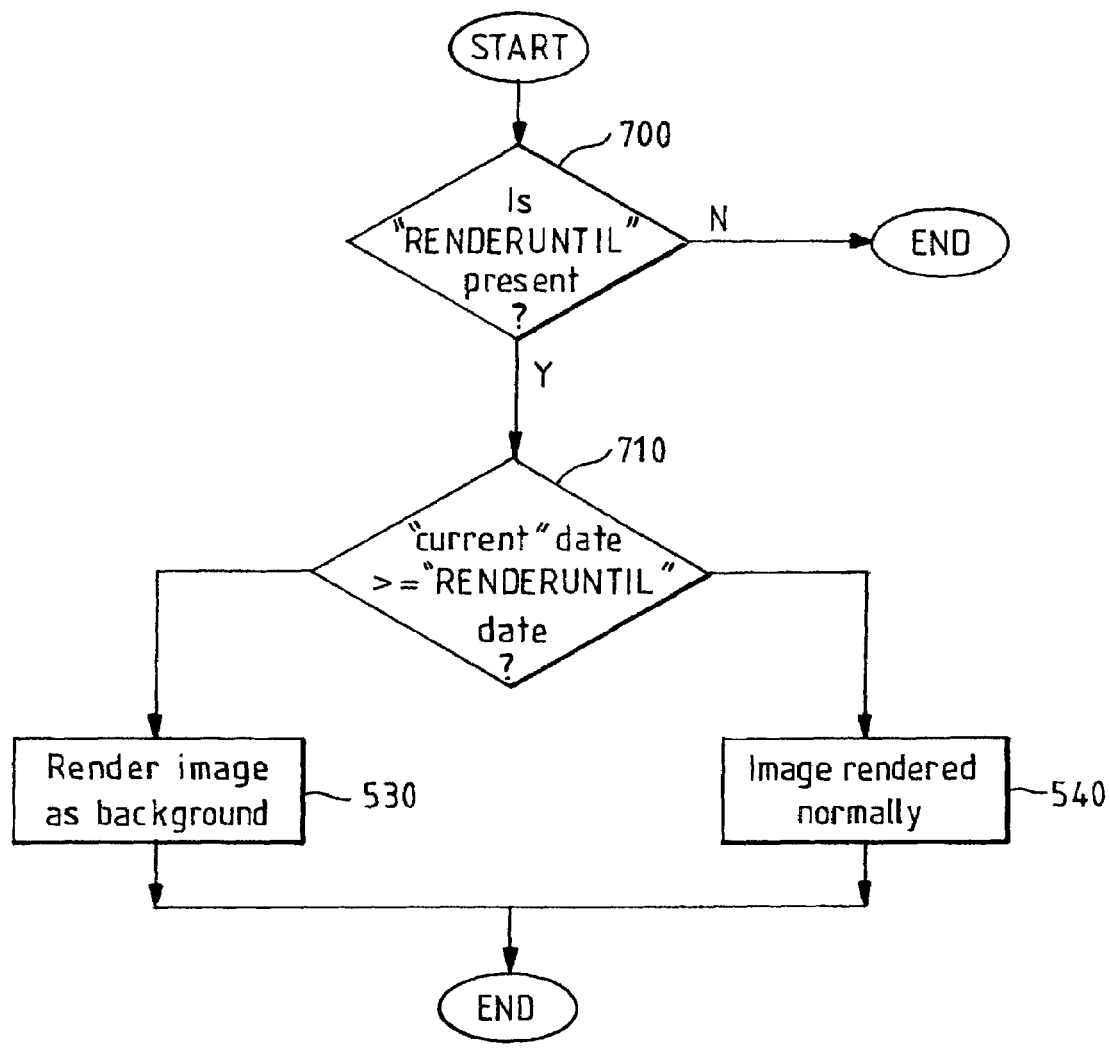
FIG. 7 is a flow chart showing the operational steps involved in the ageing of icons.

FIG. 6 depicts a process involving the RENDERTIMES attribute and FIG. 7 depicts a process involving the RENDERUNTIL attribute. Alternatively, the tag for dynamic representation and ageing could be configured to specify both the "RENDERUNTIL" and "RENDERTIMES" attributes as shown in the examples below.

A) <IMG ...... [RENDERING="DYNAMIC" [RENDERUNTIL="yyyy:mm:dd"] [RENDERTIMES="n"]]>

B) <IMG ...... [RENDERING="DYNAMIC" [RENDERDEGRADE] [RENDERUNTIL="yyyy:mm:dd"] [RENDERTIMES="n"]]>

In A), dynamic representation is implemented. In B), the attribute "RENDERDEGRADE" is added to the "<IMG>" tag in order to implement deterioration. The "RENDERDEGRADE" attribute indicates that some of the plurality of pixels, or planes of pixels, representing the image will be removed until a certain threshold (as indicated by attributes) is met.

In both A) and B), the rendering of an image could depend on:
1) Either one of the attributes OR the other being met OR
2) Both of the attributes being met
- Combination of A)+1): In this case, if either the "RENDERUNTIL" attribute is met or if the "RENDERTIMES" attribute is met, the image will appear as non-visible to the user.

As an example, if the date value specified by the "RENDERUNTIL" attribute has been exceeded, the image will appear non-visible, even if the user has not met the value for the number of visits to that web site, which is indicated by the value of the "RENDERTIMES" attribute.
- Combination of A)+2): In this case, if both the "RENDERUNTIL" attribute and the "RENDERTIMES" attribute are met, the image will appear as non-visible to the user.
- Combination of B)+1): In this case, if either the "RENDERUNTIL" attribute is met or if the "RENDERTIMES" attribute is met, the image will appear as deteriorated to the user.

For example, if only the "RENDERUNTIL" attribute is being met, to implement the deterioration of an image, the rendering process calculates the length of time left until the image is to deteriorate altogether. Next, the Web browser only renders an associated percentage of pixels of the image. If, for example, an image will be non-visible at 10 days:
At day 5: 50% of the image is rendered, 50% appears non-visible;
At day 8: 20% of the image is rendered, 80% appears non-visible;
At day 9: 10% of the image is rendered, 90% appears non-visible;
At day 10: 0% of the image is rendered, 100% appears non-visible.

Also more specifically, if only the "RENDERTIMES" attribute is being met, the "count" value held in a cookie, can be utilised to implement the rendering of pixels of an associated image. Preferably, the "count" value would signify the number of times a user has visited a Web page with an emphasised image within it. If, for example, an image will be non-visible after 10 visits to that Web page:
At <5 visits: 100% of the image is rendered, 0% appears non-visible;
At 8 visits: 50% of the image is rendered, 50% appears non-visible;
At 9 visits: 25% of the image is rendered, 75% appears non-visible;
At 10 visits: 10% of the image is rendered, 90% appears non-visible;
At >10 visits: 0% of the image is rendered, 100% appears non-visible.
- Combination of B)+2): In this case, if both the "RENDERUNTIL" attribute and the "RENDERTIMES" attribute are met, the image will appear as deteriorated and then non-visible to the user.

It should be understood that the visual conveyance of the deterioration of an image could be represented in any other way. For example, the background colour of the image itself could be utilised—that is, if an image comprises a yellow background and is displayed against a red Web browser background, the background colour of the image could turn from yellow via orange to red, as time progressed. Alternatively, the foreground pixels of the image could be degraded, or the image's background colour attributes could be set to "transparent" as time progresses. The decision regarding the rendering of an image, that is, whether an image should completely disappear or deteriorate, is preferably left to the administrator.

Preferably, the updating of the state of images, and the ageing of images, is controlled by the Web browser and an associated rendering process, rather than by utilising a localised script program running on a client computer, such as JavaScript (JavaScript is a registered trademark of Sun Microsystems, Inc.). This is because, although a script processing algorithm could control the visibility of an image, the process would entail firstly, installing a scripting language on a client computer then enabling the scripting language for the Web browser and all Web pages. Finally, the script program itself has to be downloaded on the Web page and this has a large performance overhead associated with it. Furthermore, the script program itself has to be present and individually written for each image. The preferred embodiment of the present invention therefore removes these restrictions and the need for unique rendering program code by enabling the Web browser itself to control the process to manipulate images.

It should be understood that the examples described herein of the HTML tags and the Web browser rendering calculations could be constructed in any other way. Additionally, in the preferred embodiments, the values of the thresholds for providing dynamic representation or ageing of images are the number of visits a user makes to a Web page and a time value. It should be understood that any value could be set by an administrator—for example, the number of times a user selects a textual entry or the number of times a user clicks on an icon.

It should be understood that although the preferred embodiment has been described within a networked client-server environment, the present invention could be implemented in any environment. For example, the present invention could be implemented in a stand-alone environment.

It will be apparent from the above description that, by using the techniques of the preferred embodiment, a process for automatically maintaining visual status indications is achieved whilst also providing useful information to a user about the age of the visual status indications.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

Although the present invention and its advantages have been described in detail, it should be understood that various changes, substitutions and alterations can be made herein without departing from the spirit and scope of the invention as defined by the appended claims.

The invention claimed is:

1. A method of information personalisation, said information having an associated status indication, said method comprising the steps of:
   displaying said information;
   determining the presence of one or more attributes associated with said status indication, wherein at least one of said attributes is associated with the number of times said information has been viewed;
   in response to a successful determining step, comparing each of said attributes against a separate respective threshold, in which each of said separate respective thresholds determines rendering of said associated status indication, by comparing a first value to a second value,
   wherein comparing said first value to said second value further comprises utilising said first value representing a number of times said information has been viewed, wherein utilizing a first value further comprises secondly determining if a data block comprising said first value is present, whereby in response to a successful secondly determining step, said first value is utilised and in response to an unsuccessful secondly determining step, said first value is assigned,
   wherein comparing said further value to said second value further comprises utilizing said second value representing one of said separate respective thresholds and specifying a threshold number of viewing times, wherein in response to a successful determining step, utilizing said second value associated with each of the attributes or assigning, in response to an unsuccessful determining step, said second value;
   in response to said comparing step, if one or more of said separate respective thresholds are met, rendering for display, said associated status indication as an updated status indication, and
   if one or more of said separate respective thresholds are not met, rendering for display, said associated status indication.

2. A method as claimed in claim 1, further comprising the step of:
   in response to rendering for display said associated status indication as an updated status indication, maintaining said first value.

3. A method as claimed in claim 1, further comprising the step of:
   in response to rendering for display said associated status indication, updating said first value.

4. A method as claimed in claim 3, in which if a data block is present, said data block is updated with said updated first value and if a data block is not present, a data block is created with an updated first value.

5. A method as claimed in claim 1, in which at least one of said attributes is associated with a time value.

6. A method as claimed in claim 5, in which said first value represents the current time.

7. A method as claimed in claim 6, in which said first value is obtained from a system clock.

8. A method as claimed in claim 1, in which said updated status indication is non-visible.

9. A method as claimed in claim 1, in which said updated status indication is partially visible.

10. A method as claimed in claim 9, in which said rendering of said updated status indication is associated with said first value.

11. A method as claimed in claim 1 in which said status indication is a picture.

12. A method as claimed in claim 1 in which said status indication is textual.

13. A method as claimed in claim 1, in which said information is represented within a web page.

14. A method as claimed in claim 1, in which said status indication comprises one or more planes of pixels.

15. A method as claimed in claim 1, in which said one or more attributes are specified within a tag.

16. A method as claimed in claim 1, in which said information is displayed in a web browsing session and said status indication is rendered by a web browsing session process.

17. A system for information personalisation, said information having an associated status indication, said system further comprising:
   means for displaying said information and said associated status indication;
   means for determining the presence of one or more attributes associated with said status indication, wherein at least one of said attributes is associated with the number of times said information has been viewed;
   means, responsive to a successful determining step, for comparing each of said attributes against a separate respective threshold, in which each of said separate respective thresholds determines rendering of said associated status indication, by comparing a first value to a second value,
   wherein comparing said first value to said second value further comprises utilising said first value representing a number of times said information has been viewed, wherein utilizing a first value further comprises secondly determining if a data block comprising said first value is present, whereby in response to a successful secondly determining step, said first value is utilised and in response to an unsuccessful secondly determining step, said first value is assigned;
   wherein comparing said further value to said second value further comprises utilizing said second value representing one of said separate respective thresholds and specifying a threshold number of viewing times, wherein in response to a successful determining step, utilizing said second value associated with each of the attributes or assigning, in response to an unsuccessful determining step, said second value, and
   means, responsive to said means for comparing and if one or more of said separate respective thresholds is met, for rendering for display, said associated status indication as an updated status indication, and
   if one or more of said separate respective thresholds is not met, means for rendering for display, said associated status indication.

18. A computer program product comprising computer program code stored on a computer readable storage medium which, when executed on a computer, performs a method of information personalisation, said method comprising the steps of:
   displaying said information;

determining the presence of one or more attributes associated with said status indication, wherein at least one of said attributes is associated with the number of times said information has been viewed;

in response to a successful determining step, comparing each of said attributes against a separate respective threshold, in which each of said separate respective thresholds determines rendering of said associated status indication, by comparing a first value to a second value, wherein comparing said first value to said second value further comprises utilising said first value representing a number of times said information has been viewed, wherein utilizing a first value further comprises secondly determining if a data block comprising said first value is present, whereby in response to a successful secondly determining step, said first value is utilised and in response to an unsuccessful secondly determining step, said first value is assigned, wherein comparing said further value to said second value further comprises utilizing said second value representing one of said separate respective thresholds and specifying a threshold number of viewing times, wherein in response to a successful determining step, utilizing said second value associated with each of the attributes or assigning, in response to an unsuccessful determining step, said second value;

in response to said comparing step, if one or more of said separate respective thresholds are met, rendering for display, said associated status indication as an updated status indication, and if one or more of said separate respective thresholds are not met, rendering for display, said associated status indication.

\* \* \* \* \*